Figure 1:
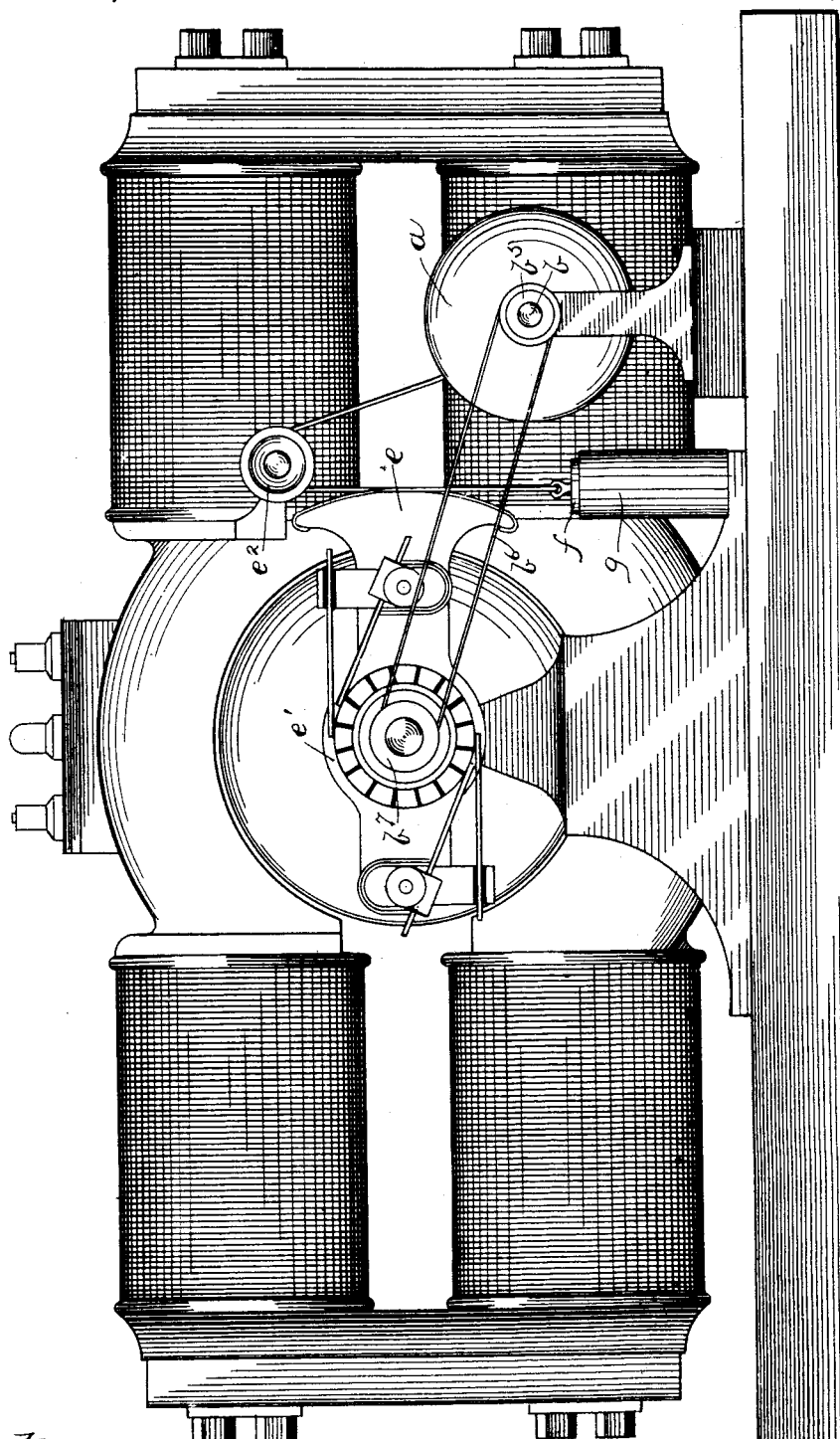

(No Model.)　　　　　　　　　　　　　　　　　3 Sheets—Sheet 1.
C. D. HASKINS.
CURRENT REGULATOR FOR DYNAMO ELECTRIC MACHINES.

No. 511,523.　　　　　　　　　　　　Patented Dec. 26, 1893.

Witnesses:
George L. Cragg
W. Clyde Jones.

Inventor
Charles D. Haskins.
By Barton & Brown
Attys.

(No Model.)

C. D. HASKINS.
CURRENT REGULATOR FOR DYNAMO ELECTRIC MACHINES.

No. 511,523. Patented Dec. 26, 1893.

Witnesses:
George L. Cragg.
W. Clyde Jones.

Inventor:
Charles D. Haskins.
By Parton & Brown
Attys

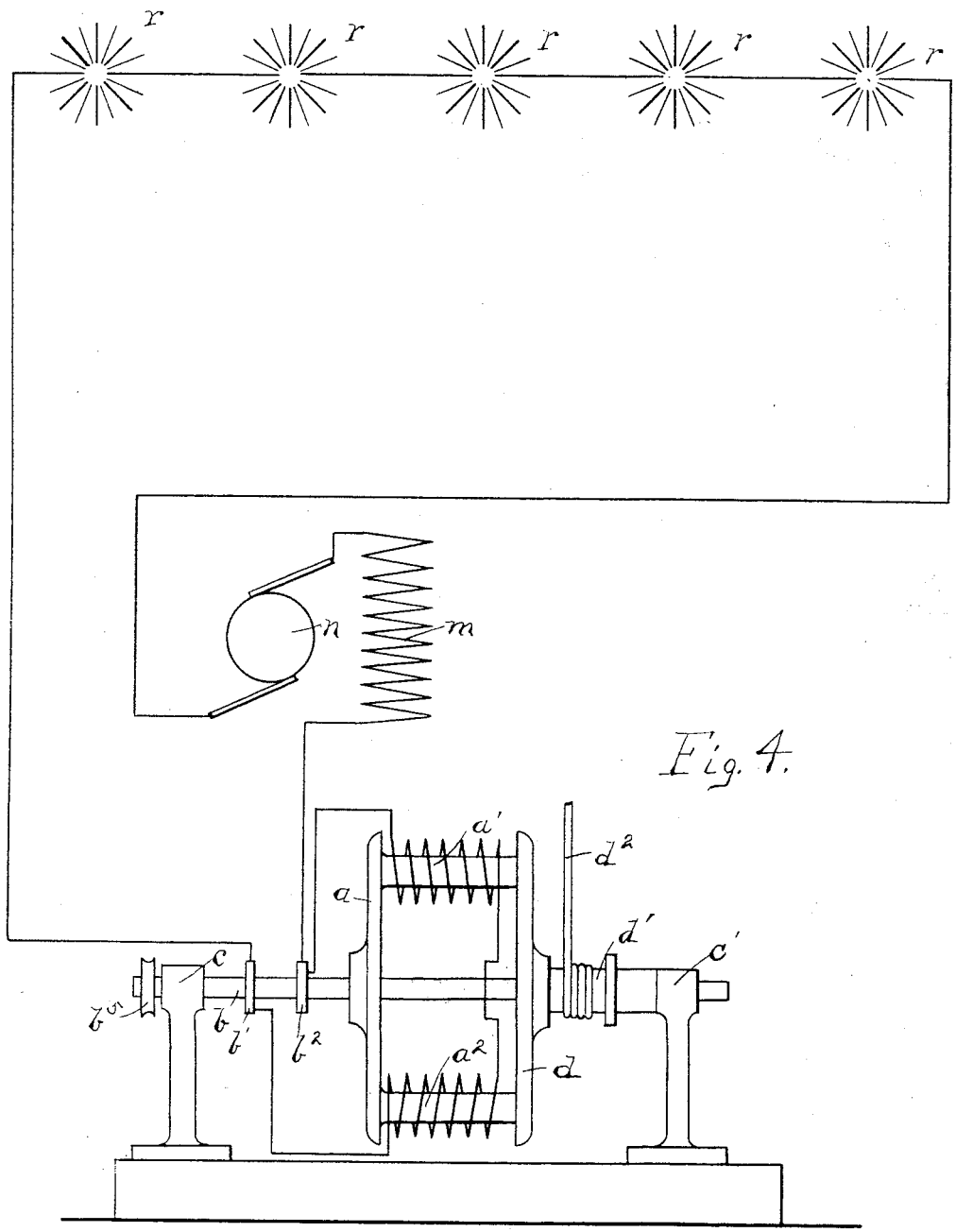

UNITED STATES PATENT OFFICE.

CHARLES D. HASKINS, OF BROOKLYN, NEW YORK, ASSIGNOR TO THE WESTERN ELECTRIC COMPANY, OF CHICAGO, ILLINOIS.

CURRENT-REGULATOR FOR DYNAMO-ELECTRIC MACHINES.

SPECIFICATION forming part of Letters Patent No. 511,523, dated December 26, 1893.

Application filed November 12, 1892. Serial No. 451,790. (No model.)

*To all whom it may concern:*

Be it known that I, CHARLES D. HASKINS, a citizen of the United States, residing at Brooklyn, in the county of Kings and State of New York, have invented a certain new and useful Improvement in Current-Regulators for Dynamo-Electric Machines, (Case No. 5,) of which the following is a full, clear, concise, and exact description, reference being had to the accompanying drawings, forming a part of this specification.

My invention relates to current regulators for dynamo electric machines, and has for its object to maintain an approximately constant current strength in the working circuit, by a regulator that shall be more compact in form and that shall respond more readily to variations in the current strength than regulators heretofore in use.

My invention relates to that class of regulators that maintain the current strength in the working circuit constant by shifting the brushes upon the commutator.

In my regulator I employ the principle that the force with which an electro magnet acts upon its armature varies with the strength of the current that excites the electro magnet, and I mount an electro magnet and its armature so that they may revolve independently and place the armature in frictional contact with the pole pieces of the electro magnet. The electro magnet is given a continuous rotary motion and acts upon the armature frictionally by its pole pieces to revolve the armature which is also acted upon by a constant force opposing the force due to frictional engagement with the pole pieces of the electro magnet. The brush carrier of the dynamo electric machine is connected with the armature of the electro magnet and movable therewith, and as the exciting current of the electro magnet increases or decreases the frictional force tending to revolve the armature against the constant opposing force will overpower or succumb to said opposing force to rotate the armature in one direction or the other, and thus shift the brushes and hence the diameter of commutation of the dynamo electric machine.

The theory of regulating dynamo electric machines by shifting the brushes upon the commutator may be described as follows: When the brushes bear upon the commutator at the diameter of maximum commutation, the difference of potential at the brushes is a maximum for a constant speed and field strength. If the brushes be shifted forward or backward from this position, the difference of potential at the brushes will be decreased, for the coils lying between the diameter of maximum commutation and the diameter of actual commutation will be generating electro motive forces opposed to the electro motive forces generated in the remaining coils upon the same side of the armature, and, consequently, the resultant difference of potential at the brushes will be less than when the brushes are set at the diameter of maximum commutation, for in the latter position all of the coils upon one side of the armature generate electro motive forces in the same direction. If the brushes be set at such a position that, for the existing resistance of the working circuit, the current strength may be of the proper value, and the resistance be then diminished, as, for instance, by throwing out of circuit one or more translating devices in a series circuit, the current strength will be increased for, the difference of potential at the brushes remaining constant and the resistance decreasing, the current strength must increase. If, now, the diameter of commutation be changed by shifting the brushes away from the diameter of maximum commutation, the difference of potential at the brushes will be decreased in the manner described, and it is evident that the brushes may be shifted to such a position that the current will be brought back to its original value. In like manner, if the resistance be increased, the current strength will be diminished, and, by moving the brushes back toward the diameter of maximum commutation, the difference of potential at the brushes may be increased until the current is brought up to its proper value. If a device be connected with the brush holder of the dynamo to move the same to shift the brushes, and this device be made responsive to changes in the current strength such that when the current is decreased, the device may act to shift the brushes to increase their difference of potential, and vice versa, automatic regulation will result. The particular manner in which I obtain this shifting of the brushes by a device responsive to changes in the current strength, will be more readily understood by reference to the accompanying drawings, in which—

Figure 2:
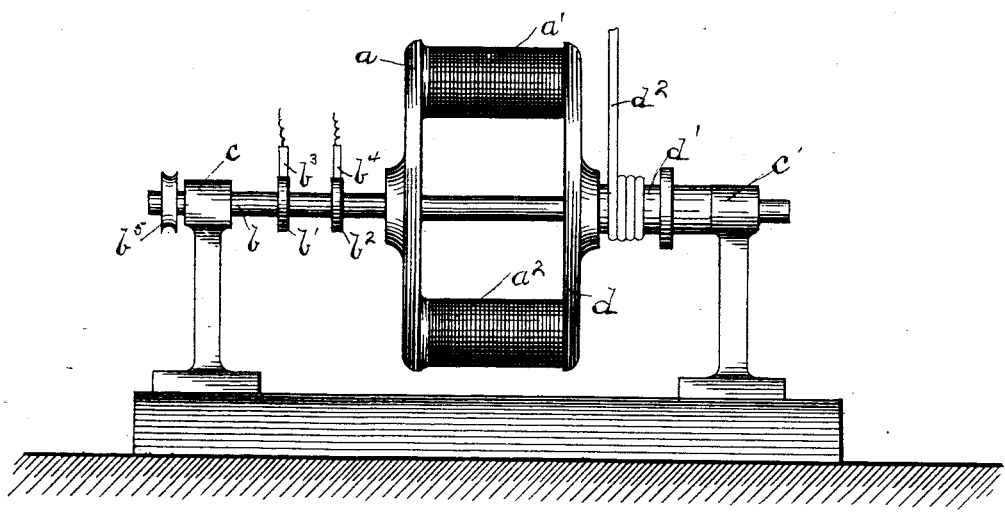
Figure 3:
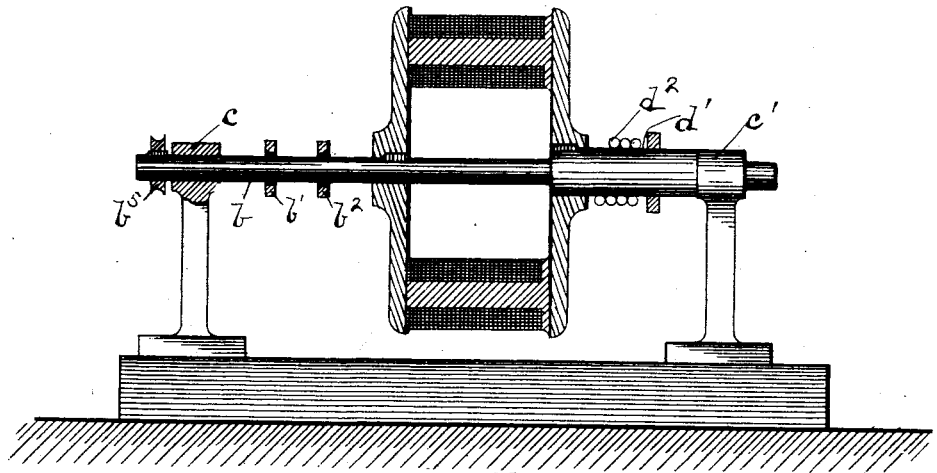

Figure 1 shows my regulator as attached to a dynamo electric machine. Fig. 2 is a side elevation of the regulator. Fig. 3 is a sectional view of a modification in which the electro magnet is attached to the brushes and the armature is continuously revolved. Fig. 4 is a diagram illustrative of my regulator as used in an arc light circuit.

Like letters refer to like parts in the several figures.

A shaft $b$ is mounted in bearings $c\,c'$. The shaft $b$ carries a disk $a$, which disk is provided with perpendicular projections $a'\,a^2$, magnetically connected therewith, and forming cores for the reception of coils, whereby the cores may be magnetically energized and magnetic poles developed at their free ends, the disk $a$ forming the yoke of the electro magnet thus produced. More than two projecting core pieces may be used if desired. Collecting rings $b'\,b^2$ are provided upon the shaft and connected with the coils of the electro magnet. Collecting brushes $b^3\,b^4$ are adapted to bear upon the collecting rings $b'\,b^2$, and by means of said brushes the windings of the electro magnet are connected in series with the working circuit.

Mounted loosely upon the shaft $b$ is a sleeve carrying the disk $d$ and the drum $d'$. The disk $d$ is adapted to bear against the faces of the pole pieces $a'\,a^2$. A belt or cord $d^2$ is attached to the drum $d'$ so that when it is revolved the belt or cord may be wound upon or unwound from the same. The belt or cord $d^2$ is attached to the brush carrier of the dynamo, and, as shown in Fig. 1, is attached to the arm $e$ of the brush carrier $e'$ after passing over the pulley $e^2$. A constant force is applied to oppose the rotation of the drum $d'$ when tending to wind up the belt or cord $d^2$, which force may be applied at the end $e$ of the brush carrier and may take the form of a suspended weight $f$. A dash pot $g$ may be provided to damp the oscillations of the brush carrier. A pulley $b^5$ is mounted upon the shaft $b$ and connected by a belt $b^6$ with a pulley $b^7$ carried upon the armature shaft of the dynamo electric machine so that, as the armature shaft of the dynamo revolves, the disk $a$, carrying the pole pieces, will revolve therewith. I preferably connect the electro magnet with the armature shaft of the dynamo electric machine so that it may continuously rotate while the armature is connected with the brush holder, but it is evident that the armature may be continuously revolved and the electro magnet connected with the brush carrier, as shown in Fig. 3.

The electrical connections are shown in Fig. 4, in which $n$ represents the armature of the dynamo, $m$ the field coils and $r\,r$ the translating devices. The regulator is shown as connected in the circuit in series with the translating devices, the current entering by one of the collecting rings, passing through the coils of the electro magnet and passing out by the other ring. As current passes through the coils wound upon the core pieces $a'\,a^2$, the armature $d$ will be attracted toward the poles of said core pieces and, the cores being continuously revolved, the tendency will be to cause the armature $d$ to revolve therewith. When the normal current strength exists, the brushes should remain at rest and consequently the armature $d$ does not revolve. The opposing force, therefore, must be so adjusted that, when the normal current exists upon the working circuit and consequently passes through the coils of the electro magnet, the electro magnet may attract the armature with such a force that the force of friction acting between the armature and the faces of the pole pieces may just equal the constant opposing force. When this condition exists, the tendency of the armature to revolve, due to the force of friction between the armature and the faces of the pole pieces, will be counterbalanced by the tendency to revolve in the opposite direction, due to the constant opposing force. If the resistance of the working circuit be increased, as by cutting into circuit one or more of the translating devices previously cut out, the current will tend to decrease in strength, but this decrease in strength will cause less current to traverse the coils of the electro magnet and, consequently, decrease the attractive force between the armature and the pole pieces. This force being decreased, the frictional force, which directly depends upon the perpendicular force exerted between the surfaces in contact, will be decreased, and said frictional force being less in value than the constant opposing force, the armature will revolve in the direction of the constant opposing force to move the brushes to a position nearer the diameter of maximum commutation, thus increasing the difference of potential at the brushes until it is just sufficient to send the normal current through the working circuit. When the normal current is again established in the working circuit by thus shifting the brushes until their difference of potential rises to the proper value, the coils of the electro magnet will be traversed by the normal current and the frictional force exerted between the armature and pole pieces will be again equal to the constant opposing force and the armature will come to rest, thus bringing the brushes to rest. If, on the contrary, some of the translating devices be cut out of circuit, the resistance will be decreased and, the difference of potential at the brushes remaining unchanged, the current strength in the working circuit will be increased. Greater current flowing in the working circuit will cause more current to flow in the coils of the electro magnet and increase the magnetic field thereof. The armature will, therefore, be attracted with a greater force and the force of friction will consequently be increased to overcome the constant opposing force and revolve the armature in the direction of the frictional force to move the brushes in a direction away from the diameter of maximum commutation, thus decreasing the difference of potential at the brushes and consequently the current strength, until the same shall have been reduced to its normal value, when the normal current again flowing through the coils of the electro magnet, the frictional force will equal the constant opposing force and the armature and brush carrier will come to rest. Thus any change in the current strength from the normal value will cause the regulator to act to bring the current strength back to its normal value.

Having described my invention, what I claim as new, and desire to secure by Letters Patent, is—

1. In a current regulator, the combination with means for producing a magnetic field whose strength is responsive to changes in the strength of the main or generated current, of an independently mounted rotatable armature, one of said elements adapted to be continuously rotated, and the motion of the other element responsive to the changes in strength of the main or generated current, and adapted to shift the position of the brushes upon the commutator to maintain an approximately constant current strength in the working circuit, substantially as described.

2. In a current regulator, the combination with means for producing a magnetic field adapted to be rotated, and responsive to changes in the strength of the main or generated current, of an independently mounted rotatable armature, whose motion is responsive to changes in said magnetic field, said rotatable armature being adapted to shift the position of the brushes upon the commutator to maintain an approximately constant current strength in the working circuit, substantially as described.

3. In a current regulator, the combination with the shifting commutator of a dynamo electric machine, of a responsive device comprising means for producing a magnetic field adapted to be rotated, and whose strength is responsive to changes in the strength of the main or generated current, and an independently mounted rotatable armature, whose motion is responsive to changes in said magnetic field, said armature being adapted to shift the position of the brushes upon the commutator to maintain an approximately constant current strength in the working circuit, substantially as described.

4. In a current regulator, the combination with a shifting commutator, of means for producing a magnetic field adapted to be rotated and whose strength is responsive to changes in the strength of the main or generated current, an independently mounted rotatable armature, whose motion is responsive to changes in said magnetic field, said armature, when rotating under the influence of said magnetic field, tending to shift the position of the brushes upon the commutator in a definite direction, and means for applying a constant force to oppose said motion, substantially as described.

5. In a current regulator, the combination with a rotatably mounted electro magnet, the strength of whose field is responsive to changes in the strength of the main or generated current, of an independently mounted rotatable armature, whose face is in frictional contact with the pole pieces of said electro magnet, a brush carrier of a dynamo electric machine attached to said armature and tending to move in a definite direction under the influence of said armature, and means for applying a constant force to oppose the said tendency of motion of the brush carrier, substantially as described.

6. In a current regulator, the combination with a rotatably mounted yoke of an electro magnet, of core pieces attached to said yoke and perpendicular thereto, magnet coils wound upon said core pieces, an independently mounted rotatable armature adapted to frictionally engage by its face with the faces of said core pieces, a brush carrier of a dynamo electric machine attached to said armature and tending to move in a definite direction under the influence of the same, and means for applying a constant force to oppose the said tendency of motion of the brush carrier, substantially as described.

7. In a current regulator, the combination with an electro magnet mounted upon a rotatable shaft, of a pulley upon said shaft for rotating the same, collecting rings upon said shaft forming the terminals of the electro magnet coils, brushes bearing thereon, an independently rotatable armature mounted upon said shaft and adapted to make frictional engagement with the pole pieces of said electro magnet, a drum or cylinder rigidly attached to said rotatable armature, a cord or belt attached to said drum and adapted to wind about said drum, a brush carrier of a dynamo electric machine attached to the other end of said cord, means for applying a constant force tending to unwind said cord from around said drum, whereby the brushes may be shifted to maintain an approximately uniform current strength in the working circuit, substantially as described.

8. The combination with translating devices arranged in series in a circuit, of a rotatably mounted electro magnet, whose coils are in series with said translating devices, an independent rotatably mounted armature, whose face is in frictional contact with the faces of the poles of said electro magnet, a brush carrier of a dynamo electric machine exciting said circuit connected with said armature and tending to move in a definite direction under the influence of the same, and means for applying a constant force to oppose the tendency of motion of the brush carrier, substantially as described.

In witness whereof I hereunto subscribe my name this 27th day of October, A. D. 1892.

CHARLES D. HASKINS.

Witnesses:
J. F. MORRISON,
J. E. HOLMAN.